United States Patent
Dominguez Romero et al.

(10) Patent No.: US 8,989,671 B2
(45) Date of Patent: Mar. 24, 2015

(54) PILOT CHANNEL TRANSMISSION IN A CELLULAR COMMUNICATION NETWORK

(75) Inventors: Francisco Javier Dominguez Romero, Madrid (ES); Beatriz Garriga Muñiz, Madrid (ES); Carlos Orobitg Morin, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 269 days.

(21) Appl. No.: 12/766,802

(22) Filed: Apr. 23, 2010

(65) Prior Publication Data
US 2010/0273500 A1    Oct. 28, 2010

(30) Foreign Application Priority Data
Apr. 23, 2009  (ES) .................................. 200930091

(51) Int. Cl.
| | |
|---|---|
| *H04B 1/00* | (2006.01) |
| *H04W 52/32* | (2009.01) |
| *E06B 3/964* | (2006.01) |
| *H04W 52/14* | (2009.01) |
| *H04W 52/24* | (2009.01) |
| *E06B 3/984* | (2006.01) |

(52) U.S. Cl.
CPC ........... *H04W 52/325* (2013.01); *E06B 3/9642* (2013.01); *H04W 52/143* (2013.01); *H04W 52/243* (2013.01); *E06B 3/984* (2013.01)
USPC ........................................... 455/63.1; 455/69

(58) Field of Classification Search
USPC .............. 455/69, 522, 1, 63.1, 423, 466, 561, 455/436, 437
See application file for complete search history.

(56) References Cited

U.S. PATENT DOCUMENTS

| | | | | |
|---|---|---|---|---|
| 2002/0077138 A1* | 6/2002 | Bark et al. | ................... | 455/522 |
| 2004/0242257 A1* | 12/2004 | Valkealahti et al. | .......... | 455/522 |
| 2006/0111137 A1* | 5/2006 | Mori et al. | .................... | 455/522 |
| 2007/0225002 A1* | 9/2007 | Keller et al. | .................. | 455/448 |
| 2007/0253363 A1 | 11/2007 | Bachl et al. | | |
| 2009/0203380 A1* | 8/2009 | Park et al. | ..................... | 455/437 |
| 2010/0113006 A1* | 5/2010 | Pajjuri et al. | .................. | 455/423 |

FOREIGN PATENT DOCUMENTS

| | | |
|---|---|---|
| EP | 1855502 | 11/2007 |
| GB | 2 375 266 A | 11/2002 |
| WO | WO 02/27966 A2 | 4/2002 |

OTHER PUBLICATIONS

Application No. 200930091, Apr. 23, 2009, Spanish Search Report.
European Search Report for EP 10 16 0931.1—1855/2247147 dated Nov. 15, 2013.
Dongwoo Kim et al: "Pilot power control and service coverage support in CDMA mobile systems", May 16, 1999, Vehicular Technology Conference, 1999 IEEE 49$^{TH}$ Houston, TX, USA May 16-20, 1999, Piscataway, NJ, USA, IEEE, US, pp. 1464-1468, XP010342094, ISBN: 978-0/7803-5565-1.

* cited by examiner

*Primary Examiner* — Tu X Nguyen
(74) *Attorney, Agent, or Firm* — Workman Nydegger

(57) ABSTRACT

A cellular communication network is described wherein the power of the pilot channel transmitted by the base station is decreased when the uplink interference in its cell area increases above a threshold value. As a result the mobile terminals at the edge of the cell area are triggered to reselect to another base station and the number of call drops and failed call set-ups is reduced.

17 Claims, 2 Drawing Sheets

PILOT CHANNEL TRANSMISSION IN A CELLULAR COMMUNICATION NETWORK

CROSS-REFERENCES AND RELATED APPLICATIONS

This application claims the benefit of the Spanish Patent Application No. ES P200930091, filed on Apr. 23, 2009, which is hereby incorporated by reference in its entirety.

BACKGROUND

1. Technical Field

Embodiments of the present invention relate to methods for transmission of a pilot channel in a cellular communication network as well as to a corresponding cellular communication networks.

2. Description of Related Art

Existing third generation (3G) cellular networks suffer from a high number of dropped calls in case of high interference in the uplink of a cell. Such high uplink interference may be due to a high number of mobile terminals that are simultaneously communicating or due to high traffic generated by some terminals in the uplink or due to power generated in the 3G frequency band by external devices. For example, devices to inhibit bomb explosions transmit radio signals in the 3G cellular frequency band and therefore add to the uplink interference in 3G networks. The effect on the uplink interference of an inhibitor device being located near a base station, for example when the car in which it is installed passes by or parks near a base station, is considerable.

When uplink interference in a cell increases, the mobile terminals in the coverage edge of the cell cannot reach the base station any more, because the signal/noise ratio of the uplink signals of these mobile terminals becomes too low for correct signal decoding by the base station. A solution provided by some manufacturers to this problem is to trigger a handover of mobile terminals not only based on the power of the downlink pilot channel received by the mobile terminal but additionally based on the uplink power of the mobile terminal received by the base station. However, even in this case call drops or failed call set-ups may occur. For example, at call set-up in a cell with high uplink interference at the base station there is no time for handing over the mobile terminals at the cell coverage edge, because the handover process takes four seconds on average. Since the radio link situation is bad from the beginning of the call set-up, the call set-up is already abandoned before the handover takes place. Furthermore, in case of Soft Handover one of the legs may be in a cell from which the mobile terminal receives the pilot channel with relatively high signal strength but the cell has high uplink interference. The other leg may be in a cell from which the mobile terminal receives the pilot channel with lower signal strength and the cell has lower uplink interference. In this situation, there will probably be a radio link failure in the cell with the high uplink interference. As a consequence, the Radio network Controller (RNC) of the 3G network removes this leg but then it will add it again because the received signal strength of the downlink pilot channel of this cell at the mobile terminal is higher than the received signal strength of the pilot channels of all other cells. The result may be a ping-pong effect with the chance of removing the cell with the lower uplink interference, which would lead to a dropped call.

SUMMARY OF THE INVENTION

According to one example embodiment, the power of the pilot channel transmitted by the base station is decreased when the uplink interference in the cell area increases above a threshold value. As a result the mobile terminals at the edge of the cell area are triggered to reselect to another 3G base station or, in case that no such base station is available, to a different Radio Access Technology (RAT), for example a 2G cellular communication network. Hereby, the number of call drops or failed call set-ups that would otherwise occur when the mobiles are at the cell edge and the uplink interference is higher than background noise, is substantially decreased.

The uplink interference in the cell area is preferably measured at or near the base station, so that a reliable estimation thereof will be obtained. According to an embodiment of the invention, the base station sends a message comprising information regarding the measured uplink interference to a control node in the cellular network, for example the RNC. The control node determines the transmission power of the pilot channel and sends a message to the base station comprising information regarding the transmission power. The base station transmits the pilot channel at the transmission power. As a result, only minor modifications are needed to the existing procedure for controlling the transmission power of the pilot channel in 3G cellular communication networks.

According to a further embodiment of the invention, the measurements are averaged over a time interval, which is configurable. Suitable values for the time interval are between 30 seconds and 15 minutes. When shorter time intervals than 15 seconds are used, there is a risk of short term fluctuations of the transmission power of the pilot channel. This would result in a high frequency of base station or network reselection by mobile terminals at the cell edges, thereby deteriorating the communication quality and further increasing the traffic load on the cellular network due to increased signalling.

The uplink interference is preferably measured by measuring the received total wideband power at the base station, although other parameters may be used.

According to a still further embodiment of the invention, the pilot channel is transmitted with a minimum power, when the uplink interference is above a further threshold value larger than the threshold value. In this way, a minimum cell coverage area is guaranteed.

According to yet a further embodiment of the invention, the transmission power of the pilot channel is a decreasing function of the uplink interference, in the range between the threshold value and the further threshold value of the uplink interference. It is particularly advantageous, if the function is a linearly decreasing function of the uplink interference, because the link budget is a linear relation in terms of dB.

In an example embodiment, the transmission power of the pilot channel is increased again, when the uplink interference falls below the threshold value. In this way, the coverage area of the cell is re-established when the uplink interference conditions are favourable, again. As a result, a reactive method is provided adapting to the real interference situation of the cellular network, reducing the cell coverage area and thereby the call drop rate when the uplink interference is high, and increasing the cell coverage area when the uplink interference is low in a dynamic way.

According to a further embodiment, a cellular communication network is provided comprising at least a base station covering a cell area, the base station being configured for transmitting a pilot channel, characterised in that the network comprises means for decreasing the transmission power of the pilot channel, when the uplink interference in the cell area increases above a threshold value.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF EXAMPLE EMBODIMENTS

Figure 1:
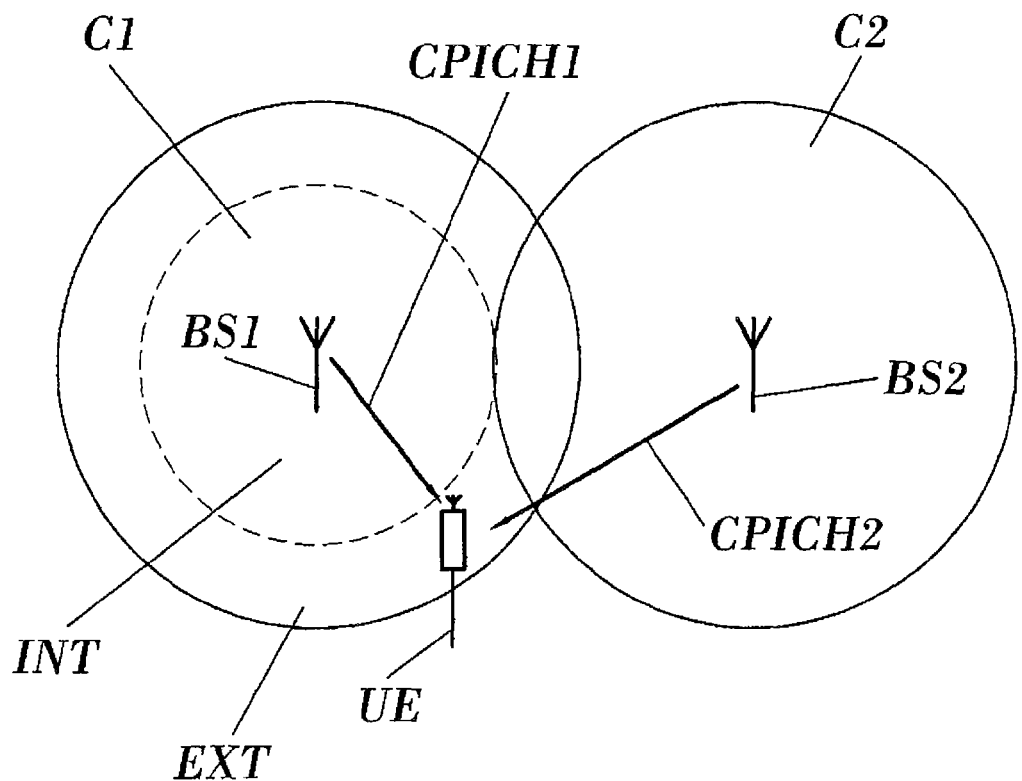
FIG. 1 shows the effect on the cell coverage area of a cell due to the decrease of the transmission power of the pilot channel.

FIG. 1 shows the effect on the cell coverage area of a cell of a third generation (3G) cellular communication network due to the decrease of the transmission power of the pilot channel. A mobile terminal UE is located at the outer part EXT of a first cell C1. The base station BS1 of the first cell under normal circumstances, i.e. as long as the Received Total Wideband Power (RTWP) at the base station is below a certain threshold, transmits a Common Pilot Channel CPICH1 at a reference power. In this situation, the received signal strength of the Common Pilot Channel CPICH1 at the mobile terminal UE is larger than the received signal strength of the Common Pilot Channel CPICH2 transmitted by the base station BS2 of a neighbouring, second cell C2. Therefore, the mobile terminal has selected the first cell C1 to be connected to. However, in case of high uplink interference in the first cell, which may be detected by measuring the RTWP at the base station of the first cell C1, the signal-noise ratio at the base station of uplink signals coming form the mobile terminal UE may become too low for correctly decoding them. This results in failed call set-ups or dropped calls of the mobile terminal.

The coverage area of a cell is reduced in case of high uplink interference by decreasing the power of the pilot channel transmitted by the base station BS1 of the cell C1. This results in a reduced coverage area INT of the cell. This has as effect that it is likely that for the mobile terminal outside this reduced coverage area the received signal strength of the pilot channel CPICH2 of the second, neighbouring cell C2 becomes larger than the received signal strength of the pilot channel CPICH1 in the first cell C1. The CPICH is the reference in the downlink for the rest of the channels of the cell and essential for the mobile to decode the information of the cell. Therefore, if the CPICH power is reduced, the mobile terminals at the cell edge reselect to a neighbouring cell, for example the second cell C2, in order to be able to make calls. In case that there is no 3G neighbouring cell available, the mobile terminals reselect to a different Radio Access Technology (RAT), such as a second generation (2G) cellular communication network.

A first possible solution is to "manually" decrease the transmission power of the CPICH to reduce the coverage and mitigate the problem of call drops or blocked calls, by intervention of operation engineers. However, this approach has limitations. The interference measurements can only be obtained by means of counters, which of average interference measurements over long periods of normally one hour. If the period were reduced, the number of counters would have to increase exponentially, which is not feasible in terms of processing and memory of the system. So, the measurements are averaged over a long time and there can be periods of higher interference levels during this averaged period, wherein call drops and failed call set-ups occur.

Figure 2:
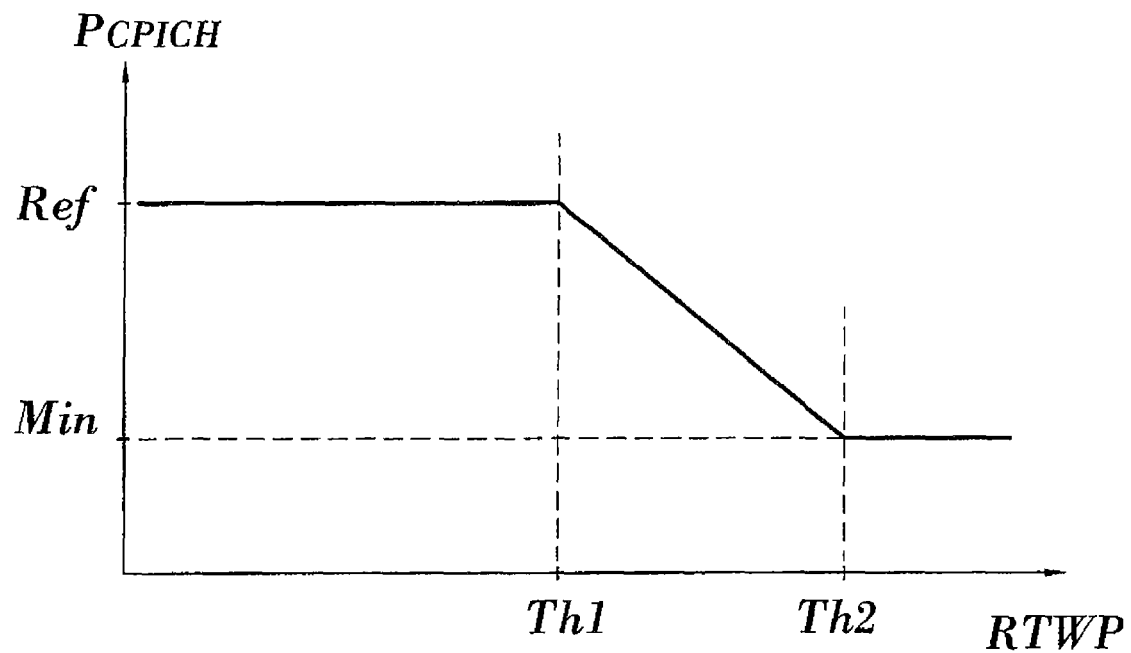
FIG. 2 shows the pilot channel transmission power as a function of the uplink interference according to an embodiment of the present invention.

Therefore, it is preferred that the transmission power of the CPICH is automatically reduced in the 3G system as reaction to the RTWP raise. It has been found, that call drops and failed call set-ups occur when the RTWP is high. Therefore, as shown in FIG. 2, it is preferred that the CPICH transmission power reduction starts at a threshold value Th1 of the RTWP. For RTWP values below threshold value Th1, the CPICH transmission power has a constant power reference value REF. The threshold value Th1 corresponds to a level of interference at which the problems of dropped calls and failed call set-ups of mobile terminals at the cell edge start. In the same way, if the RTWP decreases below the threshold value Th1, the CPICH power can be increased again. The threshold value Th1 may be empirically determined.

For RTWP values above the threshold Th1 and as shown in FIG. 2, the CPICH transmission power $P_{CPICH}$ is a function of the measured RTWP value. The function can be implemented in different ways, but the preferred one is a linearly decreasing function, because the link budget is a linear relation in dB.

This can be explained as follows: in the Node B, the signal to interference ratio received from a UE is:

$$S/I = Ptx_{UE} - L - N_0 - \text{Interference}$$

where:
 $Ptx_{UE}$ is the transmitted power by the UE.
 L is the pathloss
 $N_0$ is the thermal noise at the Node B.
 Interference is the extra-interference received at the Node B.

So, in order to maintain the S/I ratio, for every dB of extra-interference the transmission power of the UE should increase one dB.

It is now assumed that there is certain amount of extra-interference, that a UE located at the cell edge is transmitting at the maximum power permitted and that the node-B of the cell receives the signal from the UE at the minimum S/I ratio enabling correct decoding of the signal. Now, if the extra-interference further raises with one dB, the S/I of the received signal at Node-B falls one dB beneath the value needed for correct decoding because the transmission power of the UE cannot be further increased. Now, if the cell coverage is decreased by decreasing $P_{CIPCH}$ with one dB, the UE is out of the coverage of the cell and the new cell edge is positioned such that the node-B receives the signal of UEs located at the cell edge at the minimum power needed for correct decoding.

So, it should be concluded that it is advantageous, if for RTWP values above the threshold Th1, the CPICH transmission power $P_{CPICH}$ decreases linearly as a function of the measured RTWP value and preferably at the same "speed", i.e. if the RTWP increases one dB, the CPICH transmission power $P_{CPICH}$ decreases one dB, etc.

When the RTWP is over a further threshold value Th2, the CPICH is transmitted at a constant minimum power MIN to guarantee a minimum coverage of the cell.

The exemplary function shown in FIG. 2 can be expressed in pseudo code as follows:

```
If Th1 < RTWP < Th2, then
    P_CPICH = Ref − [ReduceWeighting × (RTWP − Th1)].
Else
    If RTWP < Th1, then
        P_CPICH = Ref
    Else
        P_CPICH = Min
    End
End
```

Of course, different functions of the CPICH power $P_{CPICH}$ versus RTWP interference are possible as long as the CPICH power is reduced as soon as the interference RTWP crosses the threshold value Th1. For example, $P_{CPICH}$ could be reduced in small steps as a function of increasing RTWP-values between Th1 to Th2 or $P_{CPICH}$ could have a constant value for all values of RTWP above the threshold value Th1.

The RTWP measurements are preferably averaged over a configurable time interval or "window", having a range between 30 s and 15 min.

Figure 3:
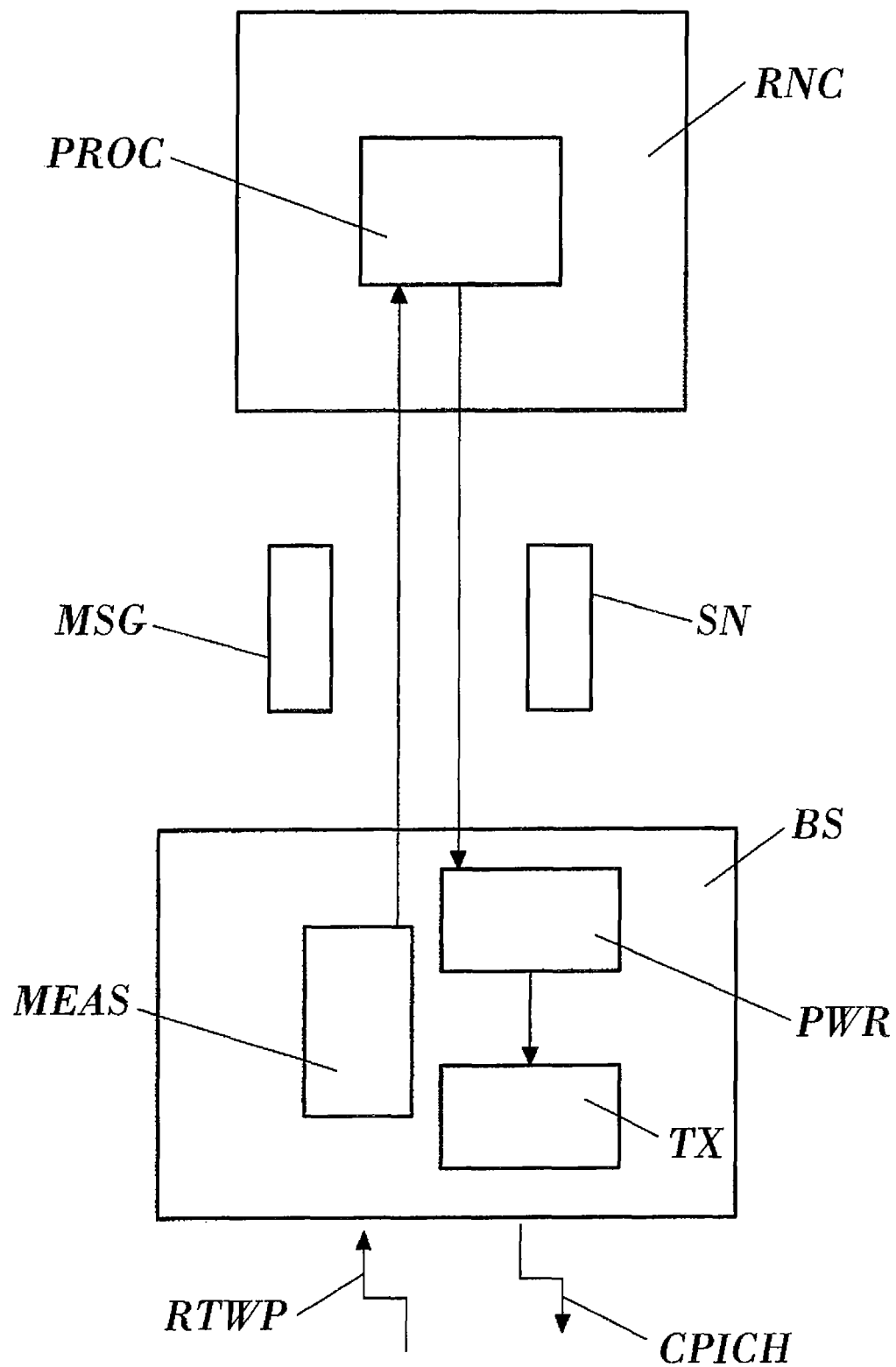
FIG. 3 shows a block diagram of the relevant parts of the cellular network according to an embodiment of the present invention.

FIG. 3 shows block diagram of an exemplary implementation in a third generation (3G) cellular communication network of the functionality described herein above. A base station BS comprises measuring means MEAS for measuring the RTWP at the base station. Alternatively, the measuring means are not part of the base station BS but located near the base station. The measuring means MEAS are configured for sending a message MSG comprising the measured RTWP values to a Radio Network Controller RNC. A processor PROC in the RNC loaded with a suitable computer program for implementing this functionality averages the RTWP measurements and calculates the transmission power $P_{CPICH}$ of the Common Pilot Channel CPICH. The RNC sends a standardized signalling message SN with instructions regarding the transmission power $P_{CPICH}$ to the base station BS (see standard 3GPP 25.413). The base station comprises a power controller PWR for controlling the power at which the Common Pilot Channel CPICH is transmitted by a transmitter TX of the base station BS according to the instructions received from the RNC. The measuring means MEAS, processor PROC and power controller PWR together are means for decreasing the transmission power ($P_{CIPCH}$) of the pilot channel.

While example embodiments of the invention have been illustrated and described in detail in the drawings and foregoing description, such illustration and description are to be considered illustrative or exemplary and not restrictive; the invention is not limited to the disclosed embodiments.

Furthermore, the invention may be implemented in cellular communication networks working according to different standards than the 3G standard disclosed in the present description, for example in Long Term Evolution (LTE) networks, which are currently being standardised. Furthermore, the functionality needed to calculate the transmission power of the pilot channel may be located in another network node than the RNC.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method comprising:
   reducing an original coverage area of a first cell of a cellular communication network by decreasing a transmission power of a pilot channel transmitted by a base station corresponding to the first cell when uplink interference in the first cell area increases above a threshold uplink interference value that is determined independent of the transmission power of the pilot channel, a mobile terminal being positioned at an edge of the first cell area, the mobile terminal having previously selected the first cell to be connected to; and
   at the mobile terminal, reselecting to a neighboring second cell of the cellular communication network in response to the reduction in coverage area of the first cell; and
   maintaining a minimum coverage area of the first cell by transmitting the pilot channel at a minimum transmission power when the uplink interference is above a further threshold value that is larger than the threshold uplink interference value.

2. The method according to claim 1, wherein the uplink interference is measured at or near the base station.

3. The method according to claim 2, wherein reducing the original coverage area of the first cell comprises:
   at the base station, sending a message comprising information regarding the measured uplink interference to a control node in the cellular, communication network;
   at the control node, determining a decreased transmission power level for the pilot channel based on the measured uplink interference and sending a message comprising information regarding the decreased transmission power level to the base station; and
   at the base station, transmitting the pilot channel at the decreased transmission power level.

4. The method according to claim 2, wherein measurements of the uplink interference are averaged over a time interval, which is configurable.

5. The method according to claim 1, wherein the uplink interference is the received total wideband power at the base station.

6. The method according to claim 1, wherein the transmission power of the pilot channel is a decreasing function of the uplink interference when the uplink interference is between the threshold uplink interference value and the further threshold value.

7. The method according to claim 6, wherein the transmission power of the pilot channel is transmitted in a linearly decreasing function of the uplink interference when the uplink interference is between the threshold uplink interference value and the further threshold value.

8. The method according to claim 1, further comprising reestablishing the original coverage area of the first cell by increasing the transmission power of the pilot channel transmitted by the base station when the uplink interference in the first cell area falls below the threshold uplink interference value.

9. A cellular communication network comprising:
   a base station covering a first cell area, the base station being configured to transmit a pilot channel;
   means for decreasing a transmission power of the pilot channel to reduce an original coverage area of a first cell when uplink interference in the cell area increases above a threshold uplink interference value that is determined independent of the transmission power of the pilot channel;

means for maintaining a minimum coverage area of the first cell by transmitting the pilot channel at a minimum transmission power when the uplink interference is above a further threshold value that is larger than the threshold uplink interference value; and a mobile terminal positioned at an edge of the first cell area, the mobile terminal communicating with the base station, the mobile terminal being configured to reselect to a neighboring second cell in response to the reduction in coverage area of the first cell.

10. The cellular communication network according to claim 9, wherein the means for decreasing the transmission power of the pilot channel are configured to measure the uplink interference at or near the base station.

11. The cellular communication network according to claim 10, further comprising a control node, wherein the base station is configured to send a message comprising information regarding the measured uplink interference to the control node, the control node is configured to determine a decreased transmission power level for the pilot channel based on the measured uplink interference and to send a message comprising information regarding the decreased transmission power level to the base station and the base station is configured to transmit the pilot channel at the decreased transmission power level.

12. A method comprising:

reducing an original coverage area of a cell of a first cellular communication network by decreasing the transmission power of a pilot channel transmitted by a base station corresponding to the cell when uplink interference in the cell area increases above a threshold uplink interference value that is determined independent of the transmission power of the pilot channel, a mobile terminal being positioned at an edge of the cell area, the mobile terminal having previously selected the cell to be connected to; and at the mobile terminal, reselecting to a cell of a second cellular communication network corresponding to a different Radio Access Technology (RAT) in response to the reduction in coverage area of the cell of the first cellular communication network; and maintaining a minimum coverage area of the cell of the first cellular communication network by transmitting the pilot channel at a minimum transmission power when the uplink interference is above a further threshold value that is larger than the threshold uplink interference value.

13. The method according to claim 12, wherein the first and second cellular communication networks respectively comprise a 3G cellular communication network and a 2G cellular communication network.

14. The method according to claim 12, wherein reducing the original coverage area of the cell of a first cellular communication network comprises:

at the base station, sending a message comprising information regarding the measured uplink interference to a control node in the first cellular communication network;

at the control node, determining a decreased transmission power level for the pilot channel based on the measured uplink interference and sending a message comprising information regarding the decreased transmission power level to the base station; and at the base station, transmitting the pilot channel at the decreased transmission power level.

15. The method according to claim 12, wherein the transmission power of the pilot channel is a decreasing function of the uplink interference when the uplink interference is between the threshold uplink interference value and the further threshold value.

16. The method according to claim 15, wherein the transmission power of the pilot channel is transmitted in a linearly decreasing function of the uplink interference when the uplink interference is between the threshold uplink interference value and the further threshold value.

17. The method according to claim 12, further comprising reestablishing the original coverage area of the cell of the first cellular communication network by increasing the transmission power of the pilot channel transmitted by the base station when the uplink interference in the cell area falls below the threshold uplink interference value.

* * * * *